(12) United States Patent
Chase

(10) Patent No.: US 9,740,441 B2
(45) Date of Patent: Aug. 22, 2017

(54) SYSTEM AND METHOD FOR DISTRIBUTING SOFTWARE UPDATES

(75) Inventor: Christopher J. Chase, Austin, TX (US)

(73) Assignee: AT&T Intellectual Property, L.P., Atlanta, GA (US)

( * ) Notice: Subject to any disclaimer, the term of this patent is extended or adjusted under 35 U.S.C. 154(b) by 1691 days.

(21) Appl. No.: 12/333,838

(22) Filed: Dec. 12, 2008

(65) Prior Publication Data

US 2010/0153943 A1    Jun. 17, 2010

(51) Int. Cl.
| | | |
|---|---|---|
| *G06F 21/00* | (2013.01) | |
| *G06F 3/12* | (2006.01) | |
| *G06F 9/445* | (2006.01) | |
| *H04N 7/167* | (2011.01) | |
| *H04N 21/443* | (2011.01) | |
| *H04N 21/458* | (2011.01) | |
| *H04N 21/472* | (2011.01) | |

(52) U.S. Cl.
CPC .............. *G06F 3/1225* (2013.01); *G06F 8/65* (2013.01); *H04N 7/1675* (2013.01); *H04N 21/443* (2013.01); *H04N 21/4586* (2013.01); *H04N 21/47202* (2013.01); *G06F 8/665* (2013.01)

(58) Field of Classification Search
USPC ............................................ 715/748; 705/51
See application file for complete search history.

(56) References Cited

U.S. PATENT DOCUMENTS

| | | | |
|---|---|---|---|
| 6,138,153 A | 10/2000 | Collins, III et al. | |
| 6,199,204 B1 | 3/2001 | Donohue | |
| 6,252,952 B1 * | 6/2001 | Kung | H04M 3/44 379/114.02 |
| 6,353,926 B1 * | 3/2002 | Parthesarathy | G06F 8/65 707/999.202 |
| 6,618,752 B1 | 9/2003 | Moore et al. | |
| 6,718,361 B1 | 4/2004 | Basani et al. | |
| 6,950,623 B2 * | 9/2005 | Brown | H04H 60/06 455/3.01 |
| 7,515,036 B2 * | 4/2009 | McClenny et al. | 340/286.02 |
| 8,040,917 B2 * | 10/2011 | Ko | H04N 21/235 370/466 |
| 2002/0002706 A1 * | 1/2002 | Sprunk | H04N 7/1675 725/29 |
| 2002/0133830 A1 | 9/2002 | Kim et al. | |
| 2003/0018582 A1 * | 1/2003 | Yaacovi | G06F 21/10 705/51 |
| 2004/0068721 A1 * | 4/2004 | O'Neill et al. | 717/168 |
| 2008/0107017 A1 | 5/2008 | Yuan et al. | |

(Continued)

*Primary Examiner* — Zeshan Qayyum
(74) *Attorney, Agent, or Firm* — Akerman LLP; Michael K. Dixon; Mamman (Roy) P. Zachariah, Jr.

(57) ABSTRACT

A system includes a control server, a data package server, a home storage device, and a set-top box. The control server is configured to provide information related to a data package. The data package server is configured to provide the data package. The home storage device is configured to receive the data package as a multicast from the data package server. Additionally, the home storage device is configured to store the data package in a storage. The set-top box is configured to receive information related to the data package from the control server and retrieve the data package from the home storage device.

20 Claims, 4 Drawing Sheets

(56) References Cited

U.S. PATENT DOCUMENTS

2008/0154775 A1* 6/2008 Soukup .................. G06F 21/10
                                                        705/51
2008/0250154 A1   10/2008 Sun et al.
2008/0310408 A1* 12/2008 Thompson ............. G06Q 30/02
                                                        370/386
2009/0031390 A1*  1/2009 Rajakarunanayake  H04N 21/4135
                                                        725/142

* cited by examiner

SYSTEM AND METHOD FOR DISTRIBUTING SOFTWARE UPDATES

FIELD OF THE DISCLOSURE

The present disclosure generally relates to communications networks, and more particularly relates to a system and method for distributing software updates.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
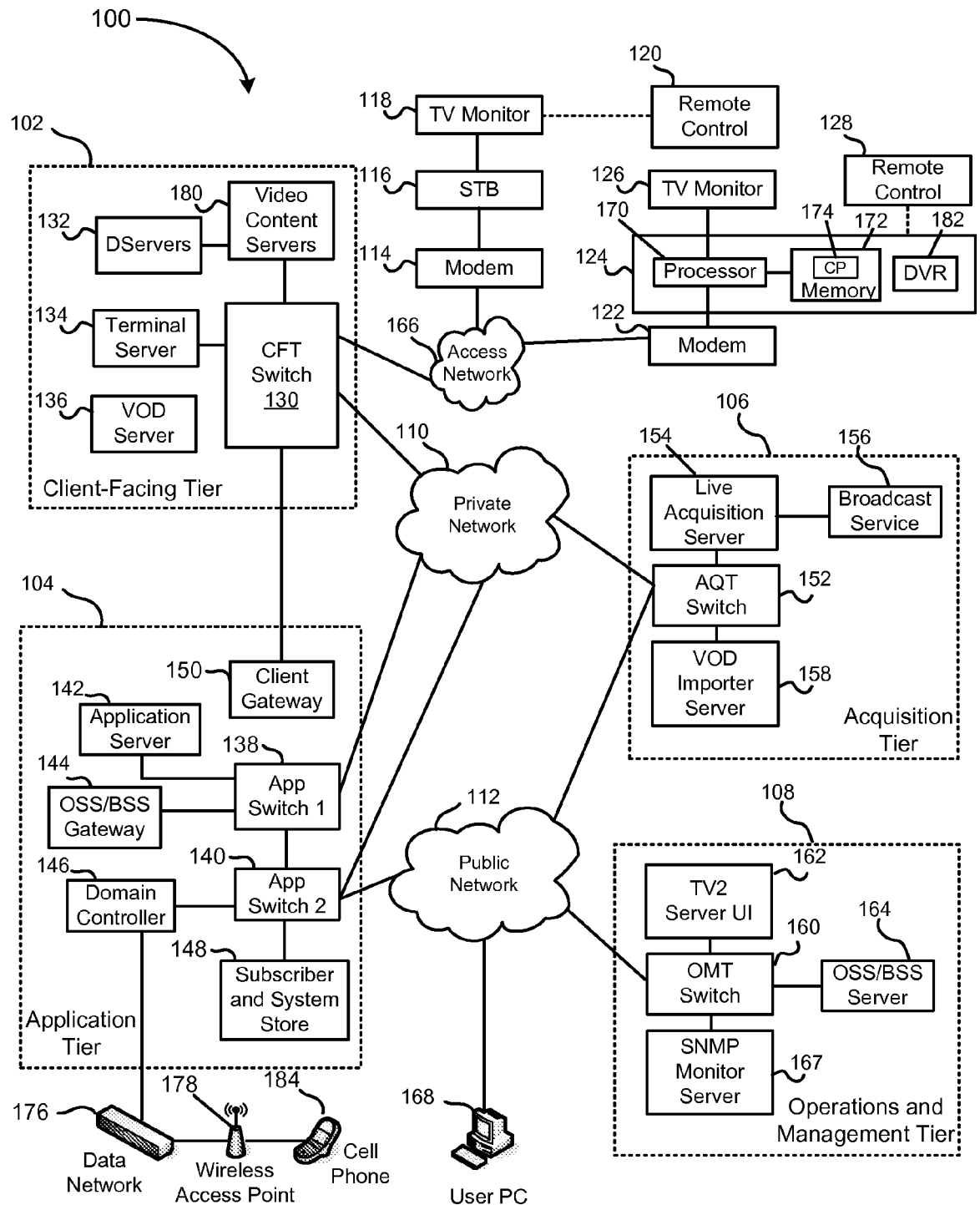
FIG. 1 is a block diagram illustrating an Internet Protocol Television (IPTV) network in accordance with one embodiment of the present disclosure.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box (STB) device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include an STB processor 170 and an STB memory device 172 that is accessible to the STB processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating the second set-top box device with a user account, or with any combination of these.

The STB computer program 174 can contain instructions to receive many types of user preferences from the domain controller 146 via the access network 166. For example, the STB computer program 174 can include instructions to receive a request to record at least one television program at a video content storage module such as a digital video recorder (DVR) 182 within the second set-top box device 124. In this example embodiment, the STB computer program 174 can include instructions to transmit the request to the DVR 182, where the television program(s) are recorded. In an illustrative embodiment, the STB computer program 174 can include instructions to receive from the DVR 182 a recording status with respect to one or more of the television programs and to transmit at least one message regarding the status to a wireless device, such as the cellular telephone 184. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP).

Figure 2:
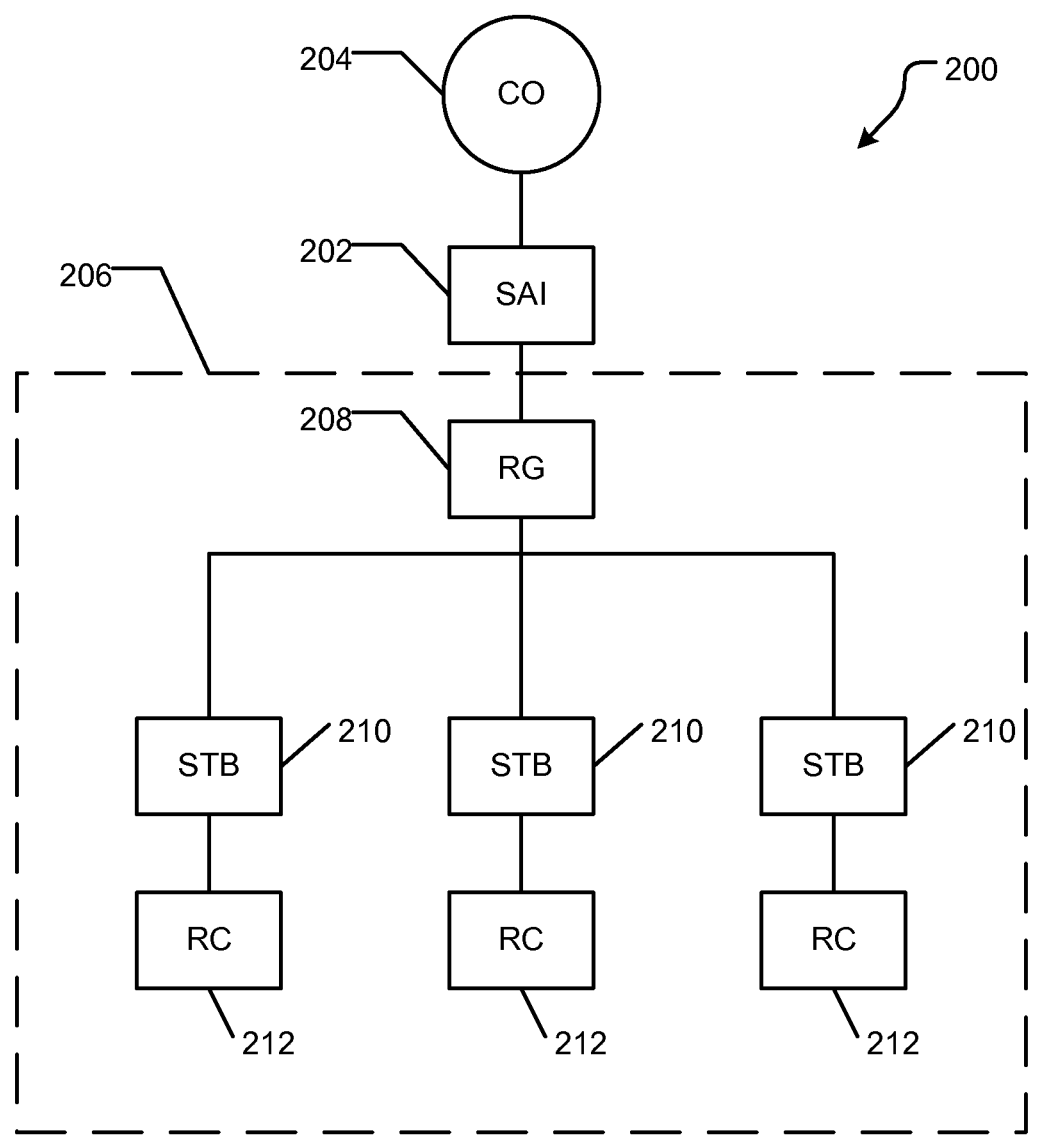
FIG. 2 is a block diagram illustrating another embodiment of an IPTV network.

FIG. 2 shows one example embodiment of a television distribution system or network 200, using IPTV technology in this example but not limited thereto, adapted to provide, among other things, the features of the disclosed subject matter. In one example embodiment, the network 200 may be connected through a plurality of high-speed communication links using physical transport layers such as fiber, cable, twisted pair, air, or other media. A serving area interface (SAI) 202 may be connected to a central office (CO) 204. SAI 202 may, for example, be located in a weather-proof enclosure proximate the subscriber premises, and may include fiber-to-the-node (FTTN) equipment. FTTN equipment may also be located in the CO 204. Customer premises equipment (CPE) 206 includes, for example, a network interface device (NID) and a residential gateway (RG) 208, with a built-in very-high-bit rate digital subscriber loop (VDSL) modem or optical network termination (ONT). In either case, the RG 208 may be connected to, and shared by, STBs 210 via an internal network such as an Ethernet. In an embodiment, the internal network can be a wireless network. STBs 210 can be similar to STBs 116 or 124. Each STB 210 has an associated remote control (RC) 212 that provides data entry to the STBs 210 to control the IPTV selections from the IPTV data streams.

In an embodiment, IPTV network 200 can be used to distribute a data package to the STBs 210. The data package can be a software update, a VOD lead-in, an encryption key, an advertisement for insertion, program guide information, or the like. The data package can be provided to all STBs 210 or a subset thereof. For example, a software update may be distributed to all active STBs to provide new features, correct issues, adjust to changes in the network, and the like. Additionally, the data package can be distributed to new STBs when they are activated.

In another example, encryption keys may be distributed to STBs to enable the STBs to decrypt encrypted audio/video streams. A first set of keys for a basic set of channels may be distributed to all STBs. Additional sets of keys for additional channel packages may be distributed only to STBs subscribing to each of the additional channel packages. Alternatively, encryption keys for all channels can be distributed to all STBs. Access controls can be implemented on each STB so that an STB can only access a channel to which it is subscribed.

In a further example VOD lead-in content, such as a first number of seconds of VOD content, may be distributed to each STB. Alternatively, viewing habits, local popularity, and other factors may be used to identify a subset of STBs most likely to view the VOD content and the VOD lead-in content may be distributed to the subset of STBs. By pre-positioning the VOD lead-in content at the STB, a viewer may begin to watch the VOD content while delivery of the remaining portion of the VOD content is being established.

In yet another example, an advertisement for insertion into a video stream may be distributed to the STBs. A video stream may include markers to indicate where the advertisement can be inserted, and the STB can select from a set of advertisements available for insertion. The advertisement may be distributed to a subset of STBs based on a viewer profile in order to target the advertisement to viewers most likely to be interested in an advertised product.

Figure 3:
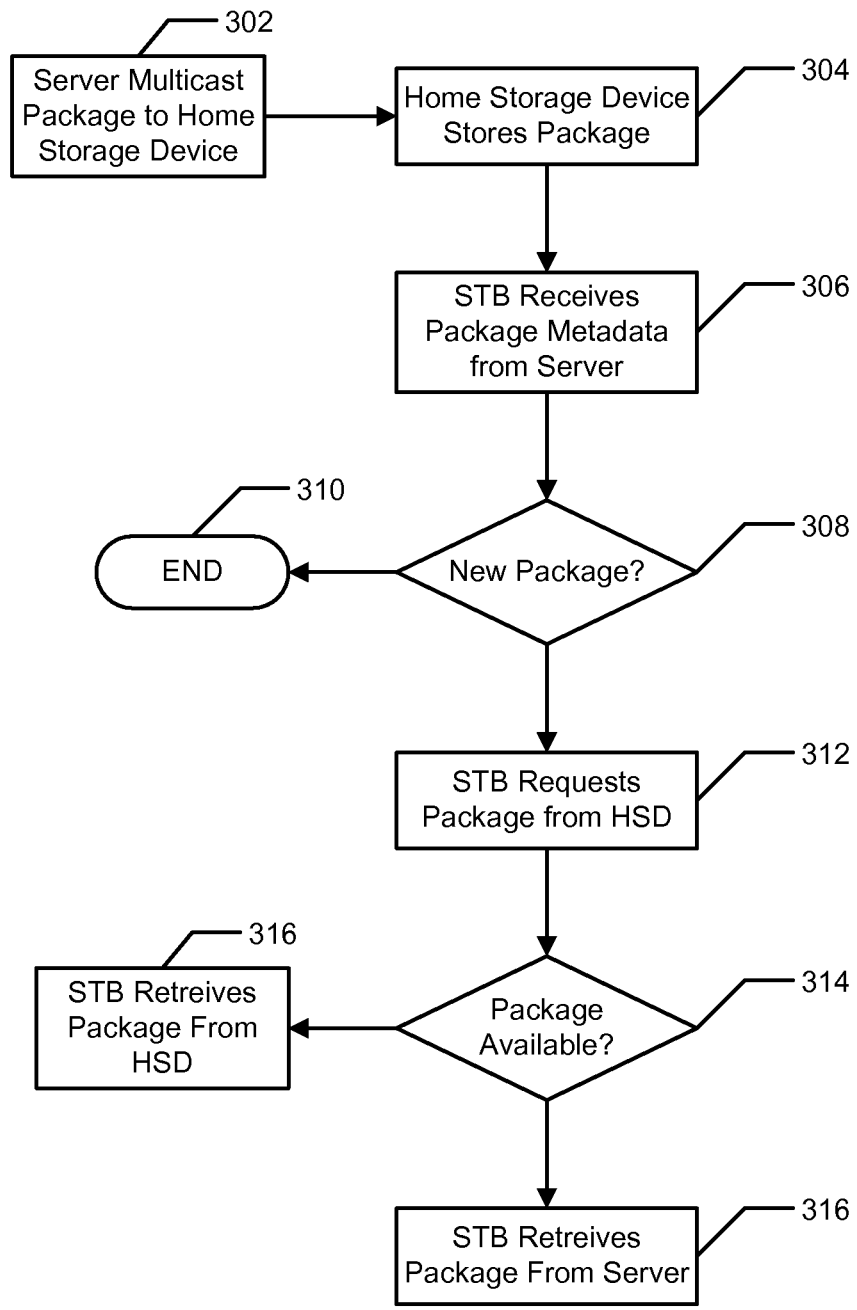
FIG. 3 is a flow diagram illustrating a method of distributing data packages.

FIG. 3 shows a flow diagram illustrating an exemplary method of distributing data packages to a plurality of STBs, such as STBs 210. At 302, a data package server can send a data package over a network to a plurality of home storage devices located at a plurality of premises using a multicast protocol. The network can be a private network such as an IPTV network, or a public network such as the Internet. The multicast protocol can be a reliable multicast protocol so that data lost or corrupted due to network errors can be recovered. For example, the reliable multicast protocol can use forward error correction or retransmission of lost packets to recover from missing or corrupted data. The data package can include a software update, a video-on-demand lead-in, an encryption key for a video stream, an advertisement for insertion into a video stream, program guide information, or any combination thereof. In an embodiment, the home storage device can be an STB including a DVR, such as STB 124. In a further embodiment, the multicast of the data package can occur over an extended period of time at a relatively low data rate so as to not have a significant impact on the network. At 304, the home storage device can store the data package.

At 306, the STB can receive information about a data package from a control server. The information can include a version or modification date of the data package, a size of the data package, information such as a checksum to verify the integrity of the data package, and the like. In an embodiment, the data package server and the control server can be the same or different physical or virtual machines. The control server may broadcast the information about the data package to the STB, such as when the multicast of the data package is complete. Alternatively, the STB may contact the control server when starting up to determine if there are new data packages available.

At 308, the STB can determine if the data package is a new data package or a data package already processed by the STB. For example, if the data package is a software update, the STB can compare the version of the software currently operating on the STB to the version of the software included in the data package. When the data package is not new, the process can end at 310. Alternatively, when the data package is new, such as a newer version of the software or a new set of encryption keys, the STB can request the package from the home storage device, as illustrated at 312.

At 314, the home storage device can determine if the data package is stored locally, such as within a local storage of the home storage device. At 316, when the home storage device has the data package, the STB can retrieve the data package from the home storage device. Alternatively, at 318, when the home storage device does not have the data package, the STB can retrieve the data package from the data package server. In an embodiment, the home storage device may also request the data package from the data package server, or the data package server may provide the data package as a multicast to both the STB and to the home storage device.

Figure 4:
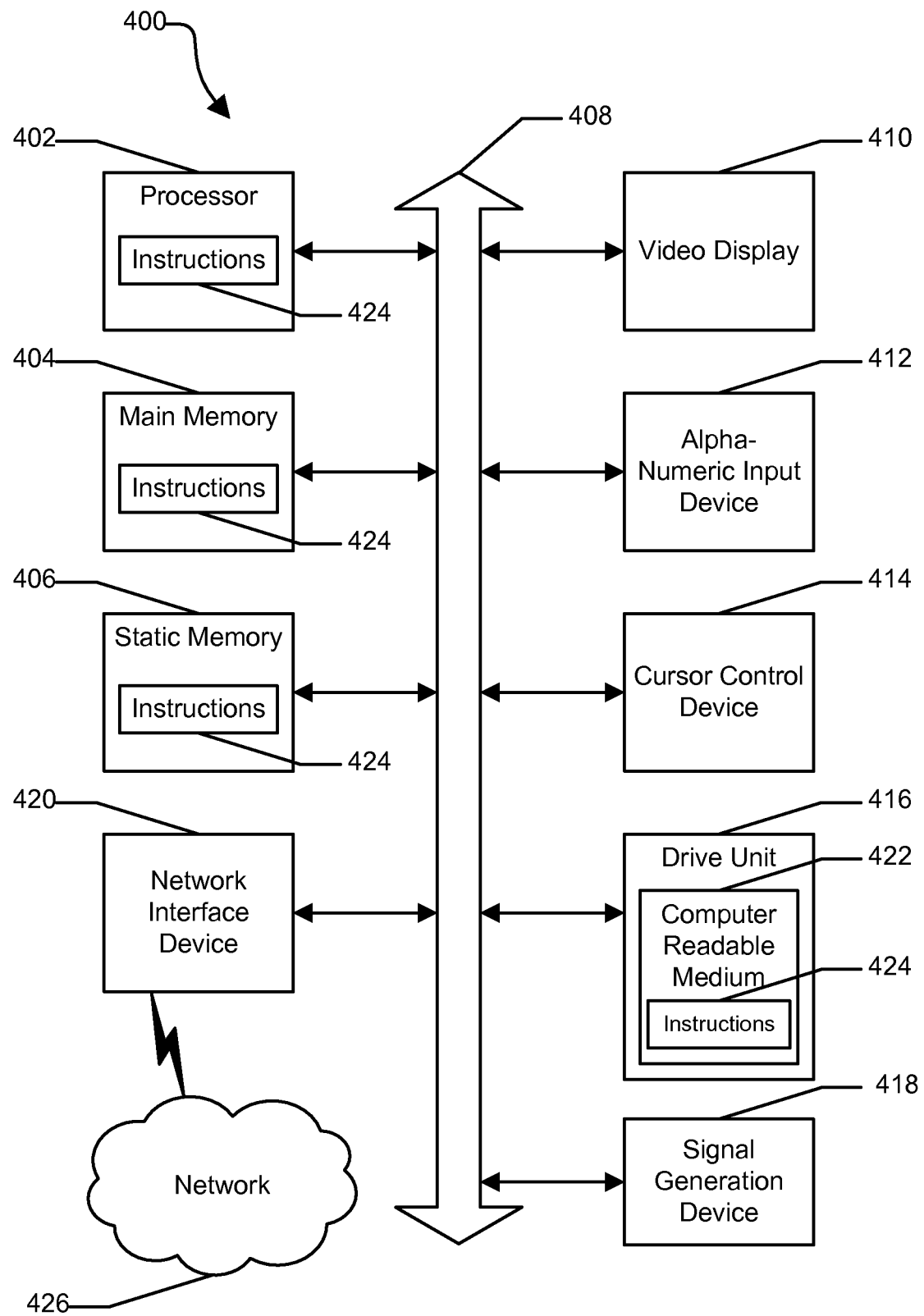
FIG. 4 is an illustrative embodiment of a general computer system.

FIG. 4 shows an illustrative embodiment of a general computer system 400. The computer system 400 can include a set of instructions that can be executed to cause the computer system to perform any one or more of the methods or computer based functions disclosed herein. The computer system 400 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410 such as a liquid crystal display (LCD), an organic light emitting diode (OLED), a flat panel display, a solid-state display, or a cathode ray tube (CRT). Additionally, the computer system 400 may include an input device 412 such as a keyboard, and a cursor control device 414 such as a mouse. Alternatively, input device 412 and cursor control device 414 can be combined in a touchpad or touch sensitive screen. The computer system 400 can also include a disk drive unit 416, a signal generation device 418 such as a speaker or remote control, and a network interface device 420 to communicate with a network 426. In a particular embodiment, the disk drive unit 416 may include a computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system comprising:
   a set-top box;
   a home storage device: and
   a server, comprising:
     a memory;
     a processor;
     wherein the memory stores executable instructions that, when executed by the processor causes the processor to perform the operations comprising:
     implementing a data package server and a control server on a virtual machine;
     identifying, based on a viewing habit, the set-top box for viewing content provided in a data package;
     pre-positioning, at the set-top box, video-on-demand lead-in content corresponding to a first number of seconds of the content;
     causing the video-on-demand lead-in content to play while delivery of a remaining portion of the content is being established;
     associating a user account of a user with the set-top box by associating the user account with an internet protocol address of the set-top box, with data relating to a twisted pair connected to the set-top box, with data relating to fiber optic cables connected to the set-top box, and with an alphanumeric identifier of the set-top box;
     receiving, from the set-top box and while the set-top box is starting up, a request for information related to the data package;
     providing, via the control server and in response to the request received from the set-top box while starting up the set-top box, information related to the data package to the set-top box, wherein the information related to the data package comprises a version of the data package, a modification date of the data package, a size of the data package, and a checksum for verifying an integrity of the data package;
     providing, via the data package server comprising multicast transmission protocol, the data package to the home storage device via a multicast using the multicast transmission protocol;
     storing, via the home storage device, the data package;
     determining, via the set-top box, that the data package contains a software update that is newer than a current version of software on the set-top box based on the information related to the data package;
     providing, via the home storage device and while activating the set-top box, the data package to the set-top box through an internal home network after determining that the data package contains the software update that is newer than the current version of the software on the set-top box; and
     verifying, via the set-top box, the integrity of the data package based on the checksum included in the information related to the data package.

2. The system of claim 1, wherein the operations further comprise providing the information related to the data package to the set-top box after the multicast.

3. The system of claim 1, wherein the operations further comprise providing the data package over an extended period of time at a low data rate.

4. The system of claim 1, wherein the operations further comprise inserting an advertisement into the data package, wherein the advertisement is inserted into the data package based on a marker that indicates a location at which the advertisement is to be inserted.

5. The system of claim 1, wherein the operations further comprise providing an encryption key in the data package to enable viewing of a video stream.

6. The system of claim 1, wherein the operations further comprise providing video-on-demand lead in content in the data package, wherein the video-on-demand lead in content is for display while delivery of a remaining portion of a video-on-demand content is being established.

7. The system of claim 1, wherein the operations further comprise providing a program guide in the data package.

8. The system of claim 1, wherein the operations further comprise providing error correction by utilizing the multicast transmission protocol.

9. The system of claim 1, further comprising a residential gateway that is connected to the set-top box.

10. The system of claim 1, wherein the home storage device comprises a digital video recorder.

11. The system of claim 1, wherein the operations further comprise providing the data package to the home storage device via the multicast over an internet protocol television network.

12. The system of claim 1 wherein the internal home network includes an ethernet network, a wireless network, or any combination thereof.

13. A method comprising:
   Implementing by a server a data package server and a control server on a virtual machine;
   Identifying by the server, based on a viewing habit and by utilizing instructions from memory that are executed by a processor of a server, a set-top box for viewing content provided in a data package;
   pre-positioning by the server, at the set-top box, video-on-demand lead-in content corresponding to a first number of seconds of the content:
   causing by the server the video-on-demand lead-in content to play while delivery of a remaining portion of the content is being established;
   associating by the server a user account of a user with the set-top box by associating the user account with an internet protocol address of the set-top box, with data relating to a twisted pair connected to the set-top box, with data relating to fiber optic cables connected to the set-top box, and with an alphanumeric identifier of the set-top box;
   receiving by the server, from the set-top box and while the set-top box is starting up, a request for information related to the data package;
   providing by the server, via the control server and in response to the request received from the set-top box while starting up the set-top box, information related to the data package to the set-top box, wherein the information related to the data package comprises a version of the data package, a modification date of the data package, a size of the data package, and a checksum for verifying an integrity of the data package;
providing by the server, via the data package server comprising multicast transmission protocol, the data package to a home storage device via a multicast using the multicast transmission protocol;
storing by the server, via the home storage device, the data package;
determining by the server, via the set-top box, that the data package contains a software update that is newer than a current version of software on the set-top box based on the information related to the data package;
providing by the server, via the home storage device and while activating the set-top box, the data package to the set-top box through an internal home network after determining that the data package contains the software update that is newer than the current version of the software on the set-top box; and
verifying by the server, via the set-top box, the integrity of the data package based on the checksum included in the information related to the data package.

14. The method of claim 13, wherein the operations further comprise providing the information related to the data package to the set-top box after the multicast.

15. The method of claim 13, wherein the operations further comprise providing the data package over an extended period of time at a low data rate.

16. The method of claim 13, wherein the operations further comprise inserting an advertisement into the data package, wherein the advertisement is inserted into the data package based on a marker that indicates a location at which the advertisement is to be inserted.

17. A non-transitory computer readable medium storing instructions, that when executed by a processor of a server, cause the processor of the server to perform operations comprising:
implementing a data package server and a control server on a virtual machine;
identifying, based on a viewing habit, a set-top box for viewing content provided in a data package;
pre-positioning, at the set-top box, video-on-demand lead-in content corresponding to a first number of seconds of the content;
causing the video-on-demand lead-in content to play while delivery of a remaining portion of the content is being established;
associating a user account of a user with the set-top box by associating the user account with an internet protocol address of the set-top box, with data relating to a twisted pair connected to the set-top box, with data relating to fiber optic cables connected to the set-top box, and with an alphanumeric identifier of the set-top box;
receiving, from the set-top box and while the set-top box is starting up, a request for information related to the data package;
providing, via the control server and in response to request received from the set-top box while starting up the set-top box, information related to the data package to the set-top box, wherein the information related to the data package comprises a version of the data package, a modification date of the data package, a size of the data package, and a checksum for verifying an integrity of the data package;
providing, via the data package server comprising multicast transmission protocol, the data package to a home storage device via a multicast using the multicast transmission protocol;
storing, via the home storage device, the data package;
determining, via the set-top box, that the data package contains a software update that is newer than a current version of software on the set-top box based on the information related to the data package;
providing, via the home storage device and while activating the set-top box, the data package to the set-top box through an internal home network after determining that the data package contains the software update that is newer than the current version of the software on the set-top box; and
verifying, via the set-top box, the integrity of the data package based on the checksum included in the information related to the data package.

18. The computer readable medium of claim 17, wherein the operations further comprise providing the information related to the data package to the set-top box after the multicast.

19. The computer readable medium of claim 17, wherein the operations further comprise transmitting the data package over an extended period of time at a low data rate.

20. The computer readable medium of claim 17, wherein the operations further comprise inserting an advertisement into the data package, wherein the advertisement is inserted into the data package based on a marker that indicates a location at which the advertisement is to be inserted.

* * * * *

UNITED STATES PATENT AND TRADEMARK OFFICE
CERTIFICATE OF CORRECTION

PATENT NO. : 9,740,441 B2
APPLICATION NO. : 12/333838
DATED : August 22, 2017
INVENTOR(S) : Christopher J. Chase Page 1 of 1

It is certified that error appears in the above-identified patent and that said Letters Patent is hereby corrected as shown below:

On the Title Page

Item (73) the assignee as currently stated is:
AT&T Intellectual Property, L.P., Atlanta, GA (US).

Please correct the assignee to read as follows:
--AT&T Intellectual Property I, L.P., Atlanta, GA (US)--.

Signed and Sealed this
Seventh Day of August, 2018

Andrei Iancu
*Director of the United States Patent and Trademark Office*